Feb. 15, 1938.     T. E. STOCKDALE     2,108,784

STORAGE TANK

Filed June 15, 1936

INVENTOR
Thomas E. Stockdale
BY
ATTORNEY

Patented Feb. 15, 1938

2,108,784

UNITED STATES PATENT OFFICE 2,108,784

STORAGE TANK

Thomas E. Stockdale, Hammond, Ind., assignor to Standard Oil Company, Chicago, Ill., a corporation of Indiana Application June 15, 1936, Serial No. 85,188

2 Claims. (Cl. 220—85)

This invention relates to improvements in storage tanks, and in particular, storage tanks for solid hydrocarbons.

Solid hydrocarbons, for example paraffin waxes, are usually stored in tanks provided with a steam coil in the bottom thereof for the purpose of melting the wax to facilitate its removal. Before the melted wax in the storage tank solidifies, separation and settling of water (occluded in the wax as an impurity) takes place resulting in the accumulation of a pool of water in the bottom of the tank. When it is desired to remove the wax from the tank it has been the general practice to introduce steam in a coil located in the bottom of the tank whereby the wax is melted and withdrawn. The practice of melting the wax in this manner has been unsatisfactory in that the upper layer of unmelted wax prevents the escape of vapors and the expansion of heated water and melted wax, causing excess pressure in the tank. As a result of this excess pressure there have been frequent cases of the tank being ruptured, and in some cases, blown open with considerable force.

It is therefore an object of this invention to provide a tank for the storage of solid waxes and the like which permits the expansion of melted wax and heated water.

It is another object of this invention to provide a storage tank for the storage of solid waxes which permits the melting of the wax without the accumulation of excess pressure.

It is a further object of this invention to provide a storage tank for solid waxes in which the wax may be melted without rupturing or otherwise damaging the tank.

Other objects and advantages of this invention will become apparent from the following description read in conjunction with the accompanying drawing which forms a part of this specification and in which.

Figure 1:
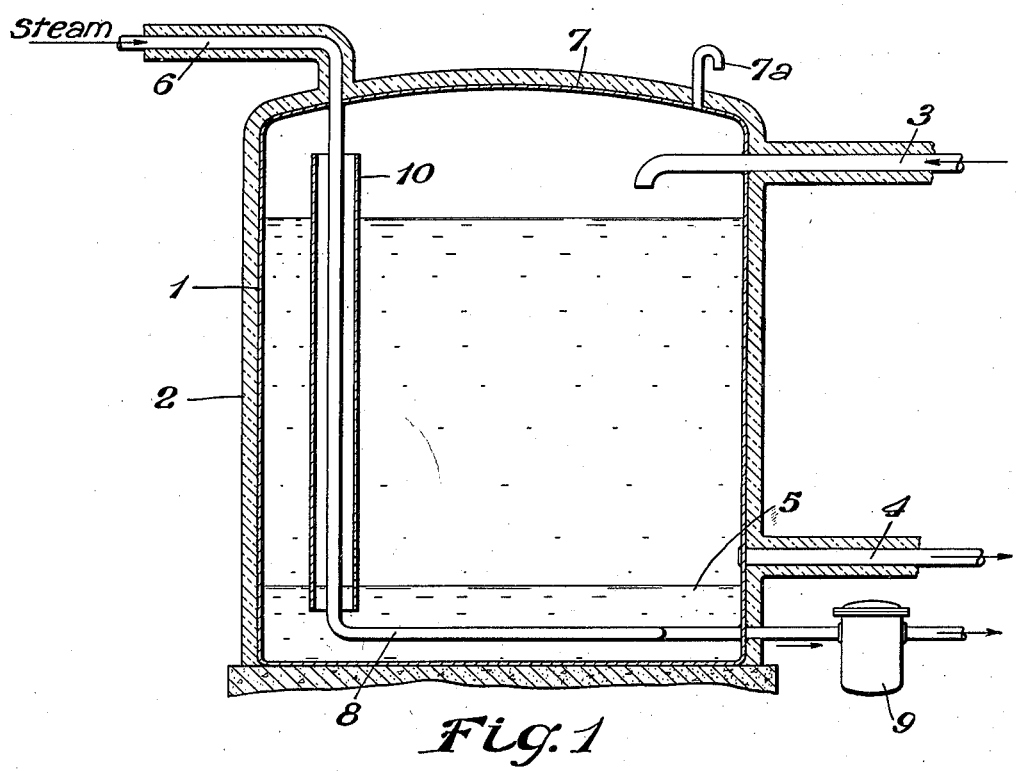
Figure 1 is a vertical section of the preferred embodiment of the invention.

Referring to the drawing the storage tank 1, preferably well insulated with a layer of insulating material 2, is provided with an insulated inlet 3 located in the upper portion thereof and an insulated outlet 4 located in the lower portion and sufficiently above the bottom thereof to be above the level of the water pool 5 in the bottom of the tank. An insulated steam line 6 enters the upper portion of tank 1 or through the roof 7, and passes downwardly through the body of the tank 1 and is connected to one end of the coil 8 located on the bottom of the tank. The other end of the coil 8 is connected to a steam trap 9 located at a point adjacent the tank 1. The vertical section of the steam line 6 is surrounded throughout substantially its entire length by a sleeve 10 which has an inside diameter substantially greater than the outside diameter of the steam line 6, and is open at both ends.

In operation molten wax is introduced into the tank 1 through the inlet pipe 3 until the desired amount of wax is introduced into the tank. While the wax is solidifying, occluded water in the wax settles out and forms a pool as indicated at 5 on the bottom of the tank, and in most cases, completely covering the coil 8. When it is desired to remove the wax from the tank, steam is passed through line 6 and the coil 8 melting the wax within the sleeve 10 from the top to the bottom forming a well of molten wax. This well of molten wax permits the expansion of heated wax and water and the escape of any gases which may be present, thereby avoiding the formation of excess pressure under a layer of solid wax as is now obtained. Steam is passed through the steam line 6 and the coil 8 until all of the wax in the tank is in a molten state. It may then be pumped out through line 4.

Figures 2, 3:
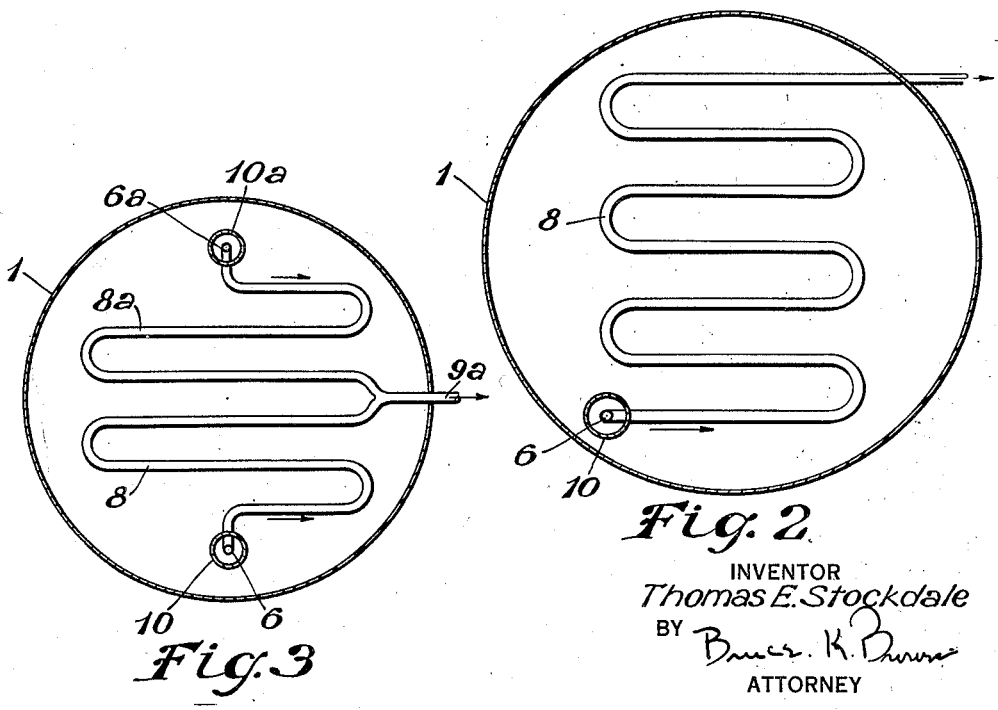
Figure 2 is a horizontal section of the preferred embodiment of the invention.
Figure 3 is a plan view of an alternative embodiment of the invention.

In storage tanks of extra large capacities it may be desirable to have a plurality of vertical steam pipes located at spaced intervals throughout the tank. In Figure 3 I have illustrated a plan view showing two vertical steam pipes and a method of connecting the same to steam coils on the bottom of the tank. Referring to Figure 3 the tank 1 is provided with two manifolded vertical steam pipes 6 and 6a connected to coils 8 and 8a respectively located on the bottom of the tank 1. The coils 8 and 8a are manifolded to the line 9a which terminates in the steam trap 9. Each of the vertical steam lines 6 and 6a are preferably surrounded with a sleeve 10 and 10a respectively. While I have limited the above description to two vertical steam pipes in the tank it is to be understood that more than two vertical steam pipes may be disposed in the tank in substantially the same manner as described.

While I have described this invention in connection with a preferred embodiment thereof, the same is merely illustrative thereof and not a limitation of the scope of the invention which is limited only by the appended claims which are to be construed as broadly as the prior art will permit.

I claim:

1. In a large capacity type of tank for storing a body of fusible normally solid hydrocarbon material such as wax, wherein there is provided a tubular heater disposed adjacent the bottom of the tank for producing liquefaction of the material adjacent a draw-off line for causing it to flow therethrough; the combination therewith of means for quickly establishing a pressure relief passageway through said body of solid material between the top thereof and said portion adjacent said tubular heating means, whereby to relieve the pressure produced by the heating of said last named portion of said material prior to the normal penetration of heat through said body of material to the upper portion thereof, said means comprising at least one conduit sleeve open at both ends, said sleeve extending from a point adjacent said tubular heater through said material to the top thereof and having a heating tube extending therethrough.

2. In a large capacity type tank for storing a body of fusible normally solid hydrocarbon material such as wax, wherein said tank is provided with a water bottom and a hot fluid conducting tubular heater below the upper level of said water bottom for heating said water to effect the melting of said solid material adjacent a draw-off line to cause it to flow therethrough, means for quickly establishing pressure relief communication through said material between said water bottom and the top of said material, said means comprising a vertically disposed conduit sleeve open at both ends and extending from the water bottom through the top of said solid material and having a hot fluid conducting tubular heater passing therethrough.

THOMAS E. STOCKDALE.